United States Patent
Giangarra et al.

(10) Patent No.: US 9,189,578 B1
(45) Date of Patent: Nov. 17, 2015

(54) SYSTEM, METHOD, AND COMPUTER PROGRAM PRODUCT FOR POWER SUPPLY NETWORK VISUALIZATION

(71) Applicant: Cadence Design Systems, Inc., San Jose, CA (US)

(72) Inventors: Philip Benedict Giangarra, Medway, MA (US); Michael James Floyd, Natick, MA (US); Leonardo Valencia, Germansville, PA (US); Debra Jean Wimpey, Hollis, NH (US); Yonghao Chen, Groton, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/938,739

(22) Filed: Jul. 10, 2013

Related U.S. Application Data

(60) Provisional application No. 61/821,832, filed on May 10, 2013.

(51) Int. Cl.
   *G06F 15/04* (2006.01)
   *G06F 17/50* (2006.01)

(52) U.S. Cl.
   CPC .................................. *G06F 17/5009* (2013.01)

(58) Field of Classification Search
   CPC ............ G06F 17/5022; G06F 2217/78; G06F 17/5036; G06F 17/504; G06F 17/505; G06F 17/5081
   USPC .................................. 716/103, 106, 127, 139
   See application file for complete search history.

(56) References Cited

U.S. PATENT DOCUMENTS

| | | | | |
|---|---|---|---|---|
| 8,407,635 B2 * | 3/2013 | Chopra | ......................... | 716/105 |
| 2010/0192115 A1 * | 7/2010 | Yang et al. | ........................ | 716/5 |
| 2011/0320991 A1 * | 12/2011 | Hsu et al. | ...................... | 716/103 |
| 2012/0198408 A1 * | 8/2012 | Chopra | ......................... | 716/127 |
| 2013/0275933 A1 * | 10/2013 | Hsu et al. | ...................... | 716/109 |
| 2013/0338991 A1 * | 12/2013 | Lin et al. | ......................... | 703/14 |

OTHER PUBLICATIONS

Dr. Gary Delp "A review of the IEEE P1801: Standard for the Design and Verification of Low Power Integrated Circuits" Distinguished Engineer, LSI, Feb. 2009.*

* cited by examiner

*Primary Examiner* — Brian Ngo
(74) *Attorney, Agent, or Firm* — Holland & Knight LLP; Mark H. Whittenberger, Esq.

(57) ABSTRACT

Embodiments of the present disclosure may include receiving, at one or more computing devices, the electronic circuit design, wherein the electronic circuit design includes at least one Unified Power Format file. Embodiments may further include generating, using the one or more computing devices, a schematic of a power supply network, based upon, at least in part, the at least one Unified Power Format file, the schematic including one or more power supply network components.

18 Claims, 13 Drawing Sheets

200 receiving, at one or more computing devices, the electronic circuit design, wherein the electronic circuit design includes at least one Unified Power Format file

202 generating, using the one or more computing devices, a schematic of a power supply network, based upon, at least in part, the at least one Unified Power Format file, the schematic including one or more power supply network components

SYSTEM, METHOD, AND COMPUTER PROGRAM PRODUCT FOR POWER SUPPLY NETWORK VISUALIZATION

CROSS-REFERENCE TO RELATED APPLICATIONS

This application claims the benefit of U.S. Provisional Application having Ser. No. 61/821,832, filed May 10, 2013, of which the entire contents are incorporated herein by reference.

FIELD OF THE INVENTION

The present disclosure relates to electronic design automation, and more specifically, to a method for displaying one or more features associated with an electronic design simulation.

BACKGROUND

Unified Power Format ("UPF") is the popular name of the Institute of Electrical and Electronics Engineers (IEEE) standard (IEEE 1801) for specifying power intent in power optimization of electronic design automation. Generally, an IEEE 1801 compliant file format may include a verbose ASCII file description of power domains and supply networks. In many instances, the power supply network may include 1000's of lines of code spread over multiple files. Connections may be created using multiple commands in multiple locations within these files, however, following connections in an ASCII form is difficult. Understanding the relationships between power switches, power nets and power supply sets feeding into power domains is impossible to understand using the low power input. This makes debugging of problems in simulation caused by improperly specified power switch networks impossible to understand. Manual creation of files is prone to user error especially with cut and paste operations. Further, the power supply network is outside of the hardware description language ("HDL") code and existing visualization for HDL does not cover non-HDL code. Moreover, the power supply network and HDL have very few connection points so it is often difficult to visualize where the power supply network and the HDL interact.

SUMMARY

In one or more embodiments of the present disclosure, a computer-implemented method for visualizing an electronic circuit design is provided. The method may include receiving, at one or more computing devices, the electronic circuit design, wherein the electronic circuit design includes at least one Unified Power Format file. The method may further include generating, using the one or more computing devices, a schematic of a power supply network, based upon, at least in part, the at least one Unified Power Format file, the schematic including one or more power supply network components.

One or more of the following features may be included. In some embodiments, the schematic may be a hierarchical schematic. In some embodiments, the one or more power supply network components may include at least one of power domains and power supply sets. The one or more power supply network components may include at least one of power switches and power supply ports. The one or more power supply network components may include power supply nets. In some embodiments, the schematic may be configured to display at least one of power switch control ports, power aware models, and hardware description language control signals. The schematic may be configured for display before, during or after a simulation. The method may include generating at least one derived power supply network signal. The method may include integrating the schematic with one or more additional display windows for simultaneous display.

In some embodiments, a computer-readable storage medium for electronic design simulation is provided. The computer-readable storage medium may have stored thereon instructions that when executed by a machine result in one or more operations. Operations may include receiving, at one or more computing devices, the electronic circuit design, wherein the electronic circuit design includes at least one Unified Power Format file. Operations may further include generating, using the one or more computing devices, a schematic of a power supply network, based upon, at least in part, the at least one Unified Power Format file, the schematic including one or more power supply network components.

One or more of the following features may be included. In some embodiments, the schematic may be a hierarchical schematic. In some embodiments, the one or more power supply network components may include at least one of power domains and power supply sets. The one or more power supply network components may include at least one of power switches and power supply ports. The one or more power supply network components may include power supply nets. In some embodiments, the schematic may be configured to display at least one of power switch control ports, power aware models, and hardware description language control signals. The schematic may be configured for display before, during or after a simulation. Operations may include generating at least one derived power supply network signal. Operations may include integrating the schematic with one or more additional display windows for simultaneous display.

In one or more embodiments of the present disclosure, a system may include a computing device having at least one processor configured to receive the electronic circuit design, wherein the electronic circuit design includes at least one Unified Power Format file. The one or more processors may be further configured to generate a schematic of a power supply network, based upon, at least in part, the at least one Unified Power Format file, the schematic including one or more power supply network components. The schematic may be configured for display before, during or after a simulation.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 2 is a flow diagram of a process in accordance with one or more embodiments of the present disclosure;

Like reference symbols in the various drawings may indicate like elements.

DETAILED DESCRIPTION

Figure 1:
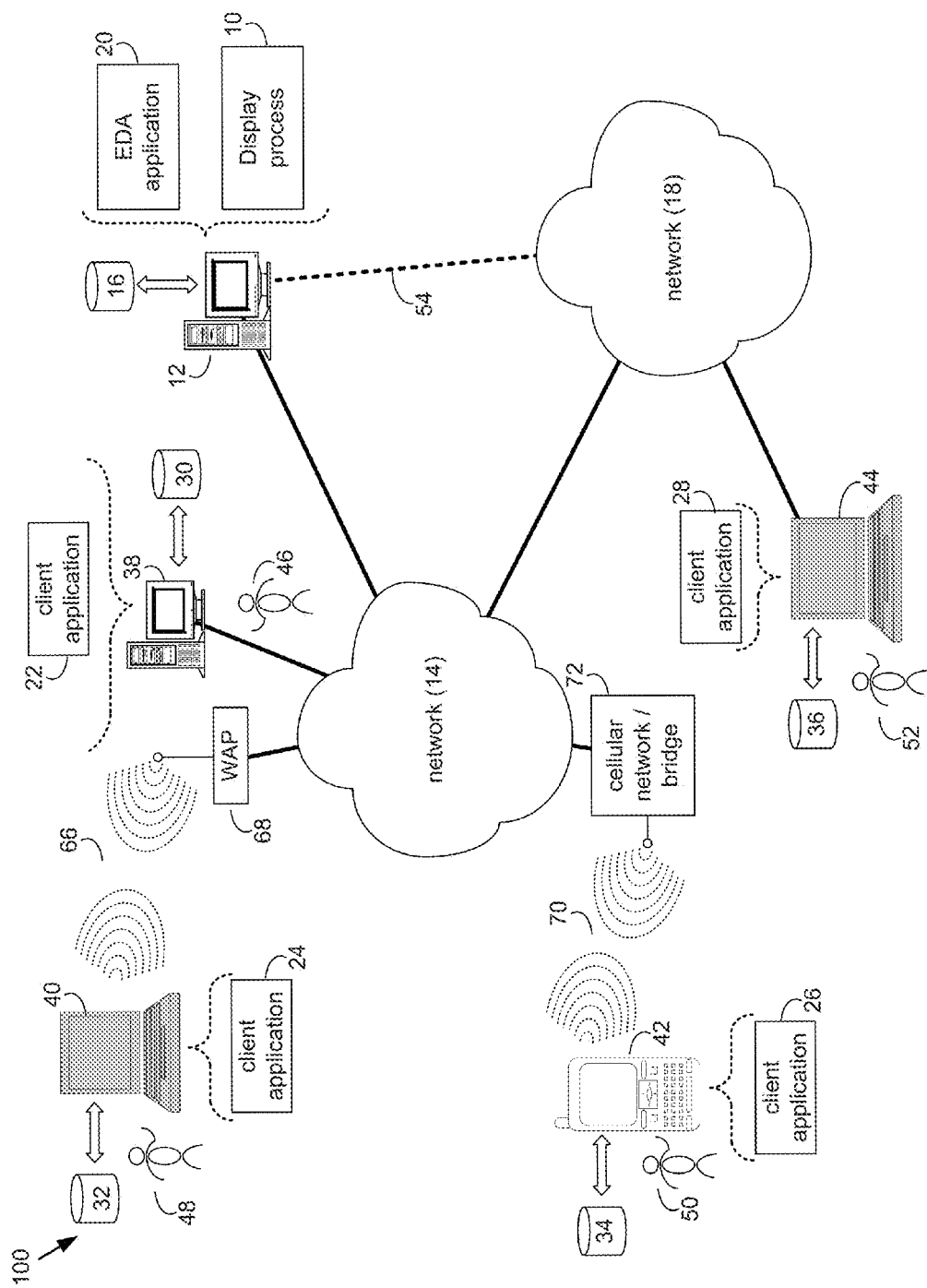
FIG. 1 is a system diagram depicting aspects of the display process in accordance with an embodiment of the present disclosure.

Embodiments of the present disclosure are directed towards visualization and annotation of the implicit IEEE 1801 Power Supply Network during the simulation of a hardware description language. Accordingly, the display process described herein may be used to create a graphical representation of the power switch network that is derived from the low power specification that is bound into simulation. By providing a graphical schematic of the implicit power supply network and how this connects into the power domains, the user may be able to navigate the low power specification and debug issues with the specification to correct incorrect power intent behavior. The schematics described herein may be configured for display before, during or after a particular simulation.

An example of an IEEE 1801 Power Supply Network is provided below.

```
create_power_domain PDcore -include_scope
SMC—Switchable @1.2V
create_power_domain PDsmc \
-elements i_smc_veneer/i_smc_lite
UART1—Switchable @1.2V and 1.0V
create_power_domain PDurt \
-elements i_oc_uart1
create_supply_port VDD
create_supply_port VSS
create_supply_port VDD_SMC
create_supply_net VDD_URT_sw
create_supply_net VDD_SMC_sw
create_power_switch ps_PDurt -domain PDurt \
-input supply_port {VDD_in VDD} \
-control_port {enable
i_power_ctrl_veneer/i_power_ctrl/pwrl_off_urt} \
-on_state {on_state VDD_in {!enable}} \
-off_state {off_state {enable}} \
-output_supply_port {VDD_out VDD_URT_sw}
create_power_switch ps_PDsmc -domain PDsmc \
-input_supply_port {VDD_in VDD_SMC} \
-control_port {enable
i_power_ctrl_veneer/i_power_ctrl/pwrl_off_smc} \
-on_state {on_state VDD_in {!enable}} \
-off_state {off_state {enable}} \
-output_supply_port {VDD_out VDD_SMC_sw}
connect_supply_net VDD -ports VDD
connect_supply_net VSS -ports VSS
connect_supply_net VDD_SMC -ports VDD_SMC
set_domain_supply_net PDsmc -primary_power_net VDD_SMC_sw \
-primary_ground_net VSS
set_domain_supply_net PDurt -primary_power_net VDD_URT_sw
\
-primary_ground_net VSS
set_domain_supply_net PDcore -primary_power_net VDD \
-primary_ground_net VSS
```

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD- ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown a display process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the report generation process may reside on and be executed, in whole or in part, by a client electronic device, such as a personal computer, notebook computer, personal digital assistant, or the like.

The instruction sets and subroutines of display process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for report generation. EDA application 20 may be referred to herein as a design tool.

Display process 10 may be a stand alone application, or may be an applet/application/script that may interact with and/or be executed within EDA application 20. In addition/as an alternative to being a server-side process, the process may be a client-side process (not shown) that may reside on a client electronic device (described below) and may interact with an EDA client application (e.g., one or more of EDA client applications 22, 24, 26, 28). Further, display process 10 may be a hybrid server-side/client-side process that may interact with EDA application 20 and an EDA client application (e.g., one or more of client applications 22, 24, 26, 28). As such, display process 10 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize display process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/ bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Embodiments of the browsing process described herein may be used in accordance with the Unified Power Format (UPF) and/or any suitable format or standard used in the design and verification of low power integrated circuits.

In some embodiments, EDA application 20 may be configured to perform testbench automation, reuse, and analysis to verify designs from the system level, through RTL, to the gate level. EDA application 20 may support a metric-driven approach. EDA application 20 may utilize a native-compiled architecture in order to speed the simultaneous simulation of transaction-level, behavioral, low-power, RTL, and gate-level models.

In some embodiments, EDA application 20 may support a variety of languages and/or standards. Some of these may include, but are not limited to, IEEE-standard languages, the Open Verification Methodology (OVM), the emerging Accellera Universal Verification Methodology (UVM), and the e Reuse Methodology (eRM). EDA application 20 may support one or more software extensions, which may provide a high-throughput channel between the testbench and the device under test (DUT), and enable automated metric driven verification of embedded software exactly as if it were another part of the DUT.

Accordingly, EDA application 20 may be configured to fuel testbench automation, analysis, and reuse for increased productivity. EDA application 20 may be configured to ensures verification quality by tracking industry-standard coverage metrics, including functional, transactional, low-power, and HDL code, plus automatic data and assertion checking EDA application 20 may be configured to drive and/or guide verification with an automatically backannotated and executable verification plan. EDA application 20 may be configured to create reusable sequences and multi-channel virtual sequences on top of a multi-language verification environment and to configure existing Universal Verification Components (UVCs) or quickly constructs all-new UVCs. EDA application 20 may be configured to enable advanced debug for transaction-level models, SystemVerilog/e class libraries, transient mixed-signal, low-power, and traditional waveform analysis.

In some embodiments, EDA application 20 may supports e, Open Verification Library (OVL), OVM class library, emerging UVM class library, SystemC®, SystemC Verification Library, SystemVerilog, Verilog®, VHDL, PSL, SVA, CPF, as well as numerous other languages. EDA application 20 may be used in accordance with mixed-language, mixed-signal, and low-power designs, across multiple levels of abstraction, and may include the ability to "hot swap" the RTL simulation in/out of numerous accelerators/emulators.

Embodiments of the present disclosure are directed towards visualization and annotation of the implicit IEEE 1801 Power Supply Network during the simulation of a hardware description language. Accordingly, the display process described herein may be used to create a graphical representation of the power switch network that is derived from the low power specification that is bound into simulation. By providing a graphical schematic of the implicit power supply network and how this connects into the power domains, the user may be able to navigate the low power specification and debug issues with the specification to correct incorrect power intent behavior. Previous solutions required that the user draw their own power supply network by hand to see how it connected to the design. This does not allow for annotation of power supply network values showing the state of the network at any point in time during the simulation run.

In some embodiments, display process 10 may be configured to generate a graphical schematic which may be derived from the IEEE 1801 power specification and may not be present in the hardware description that is being simulated. This may include, but is not limited to, power domains, power supply nets, power supply sets, power switches and power ports. Additionally and/or alternatively, the viewer may show the location of these items in which they reside. In this way, display process 10 may depict the hierarchical nature of the power supply network and how it relates to the numerous power domains which may exist within a design. The viewer may also show the control ports of a power switch and the HDL control signals that are connected to them. This is the single point of contact between the actual HDL design and the power supply network. Accordingly, display process 10 may be configured to show the connections between the HDL control signals and the power switches that use these signals to turn on and off the various power nets.

In some embodiments, the power supply network may be further annotated with values of the supply nets and control signals. In some instances, the values may be shown for any time point during the simulation. This may allow the user to not only visualize the power supply network but to also see the state of the network and how it is enabling/disabling different power domains at any point in time during a simulation. This is available as an analysis aide both during simulation and after simulation is complete.

Accordingly, display process 10 may include receiving (202) at one or more computing devices, the electronic circuit design, wherein the electronic circuit design includes at least one Unified Power Format file. For example, a UPF file may be stored in storage device 30 and may be received by computing device 38. Additionally and/or alternatively, the UPF file may be stored in any location accessible via networks 14, 18, etc.

Display process 10 may further include generating (204), using the one or more computing devices, a schematic of a power supply network, based upon, at least in part, the at least one Unified Power Format file, the schematic including one or more power supply network components. For example, the schematic may be generated using computing device 38 and may be displayed to user 46. It should be noted that the generating operation may occur at any appropriate point throughout the network and may include the generation of instructions configured to generate the display of the schematic. For example, the generation of instructions at server computing device 12.

In some embodiments, the schematic may be a hierarchical schematic. The term "hierarchical" as used herein, and in addition to its ordinary meaning, may refer to a system of groups and subgroups and/or submenus, which may allow a user to visualize certain portions of an electronic design while maintaining other portions of the electronic design as hidden, if desired.

In some embodiments, the one or more power supply network components may include, but are not limited to, power domains, power supply sets, power switches and power supply ports, power supply nets, power switch control ports, power aware models, and hardware description language control signals.

Figure 3:
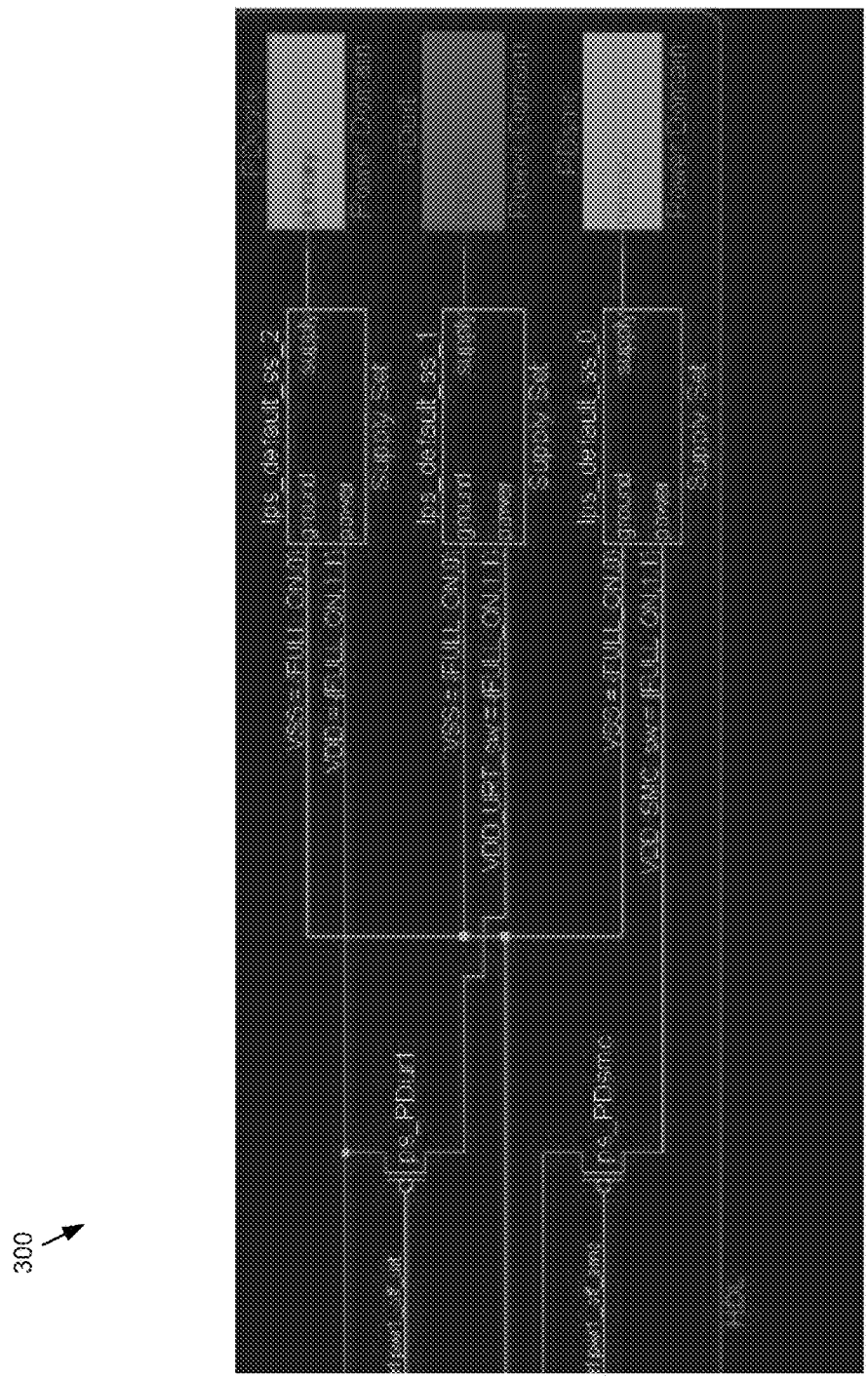
FIG. 3 is a schematic depicting aspects of the display process in accordance with an embodiment of the present disclosure.

Referring now to FIG. 3, an embodiment depicting a power supply network viewer 300 depicted in accordance with display process 10 is provided. Power supply network viewer 300 may include a dedicated window that creates a hierarchical schematic of the power supply network from the IEEE 1801 UPF files. In accordance with display process 10, viewer 300 may be configured to display any of the power supply network components discussed herein.

As discussed above, in existing systems, the creation and display of the power supply network is very difficult to understand especially in large complex system on chip designs that contain multiple IP blocks. In contrast, hierarchical power supply network viewer 300 allows the user to visualize the network and how it feeds into the power domains in the various IP blocks in the electronic design.

Figure 4:
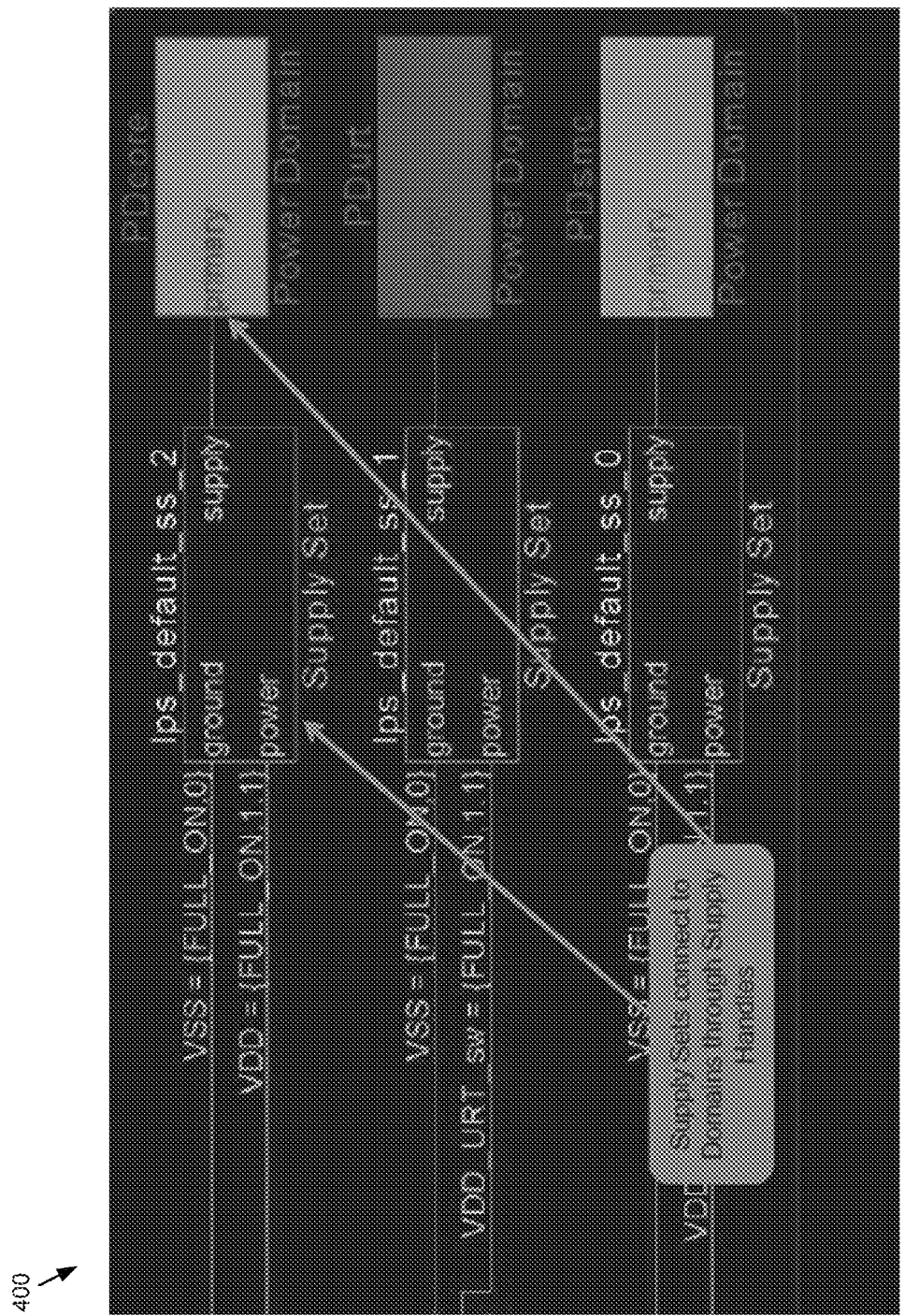
FIG. 4 is a schematic depicting aspects of the display process in accordance with an embodiment of the present disclosure.

Referring now to FIG. 4, an embodiment depicting a power supply network viewer 400 depicted in accordance with display process 10 is provided. Viewer 400 shows various power supply sets connected to one or more power domains.

Figure 5:
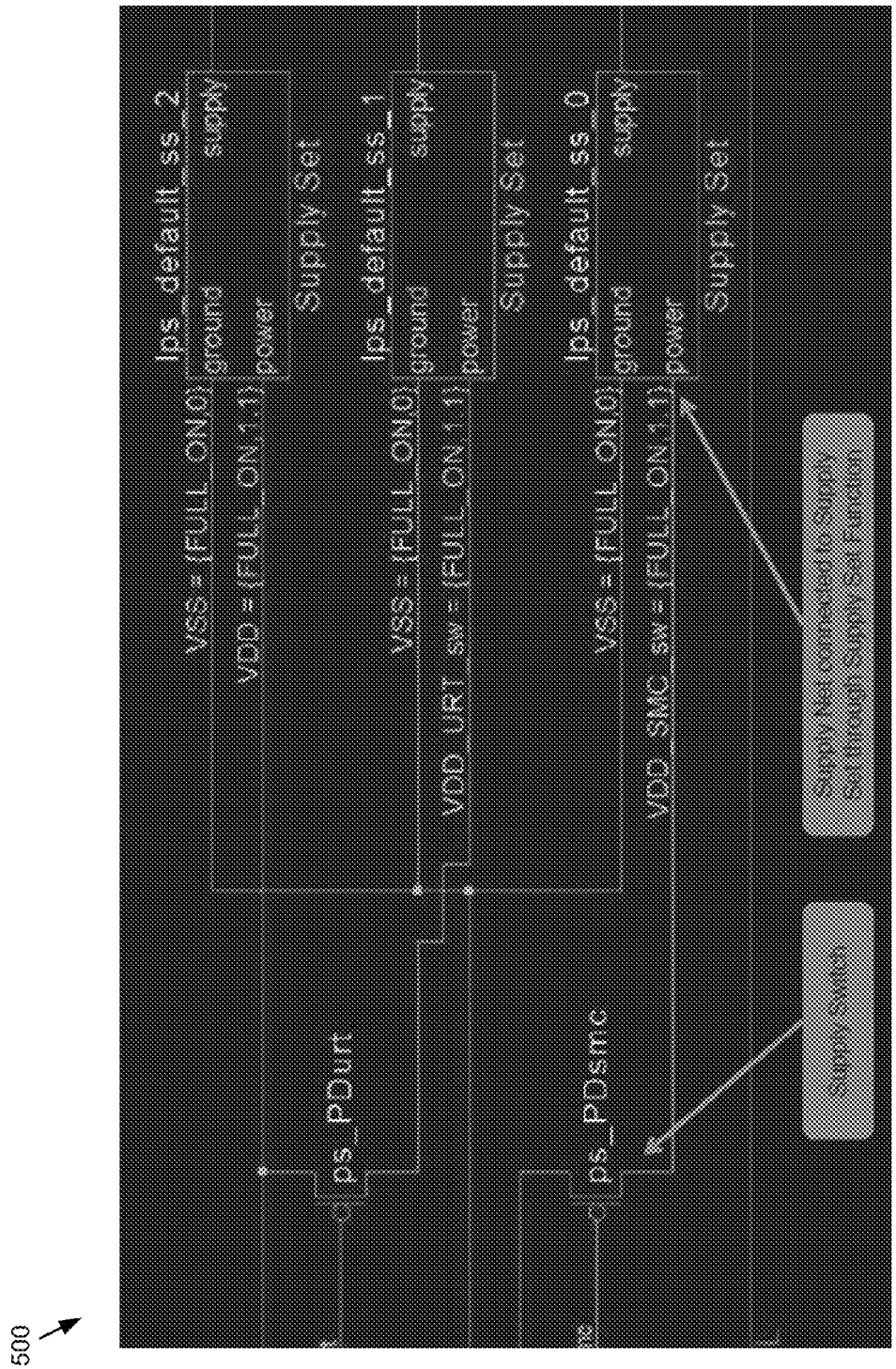
FIG. 5 is a schematic depicting aspects of the display process in accordance with an embodiment of the present disclosure.

Referring now to FIG. 5, an embodiment depicting a power supply network viewer 500 depicted in accordance with display process 10 is provided. Viewer 500 shows various power switches connected to one or more supply sets.

Figure 6:
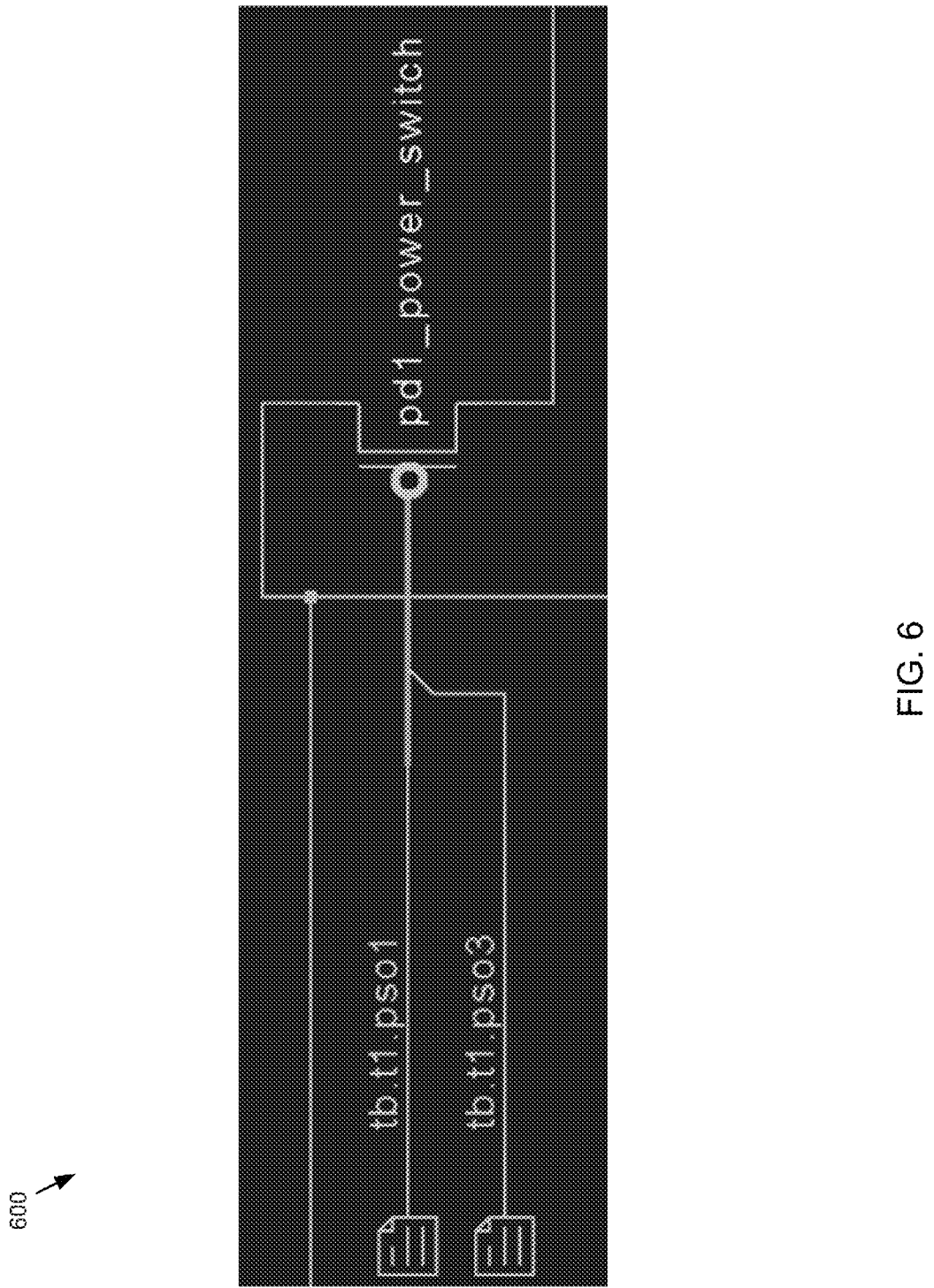
FIG. 6 is a schematic depicting aspects of the display process in accordance with an embodiment of the present disclosure.

Referring now to FIG. 6, an embodiment depicting a power supply network viewer 600 depicted in accordance with display process 10 is provided. Display process 10 may be configured to displays connections to HDL, for example, power switch control ports, and power aware models. Viewer 600 shows HDL control signals connected to power switch control ports. Accordingly, display process 10 may allow HDL signals to control switching of power switches through control ports. In some embodiments, multiple ports may exist per switch. An example of pseudocode is provided below.

create_power_switch pd1_power_switch -domain PD1 \
    -control_port {cp pso1} \
    -control_port {cp pso3} . . .

Figure 7:
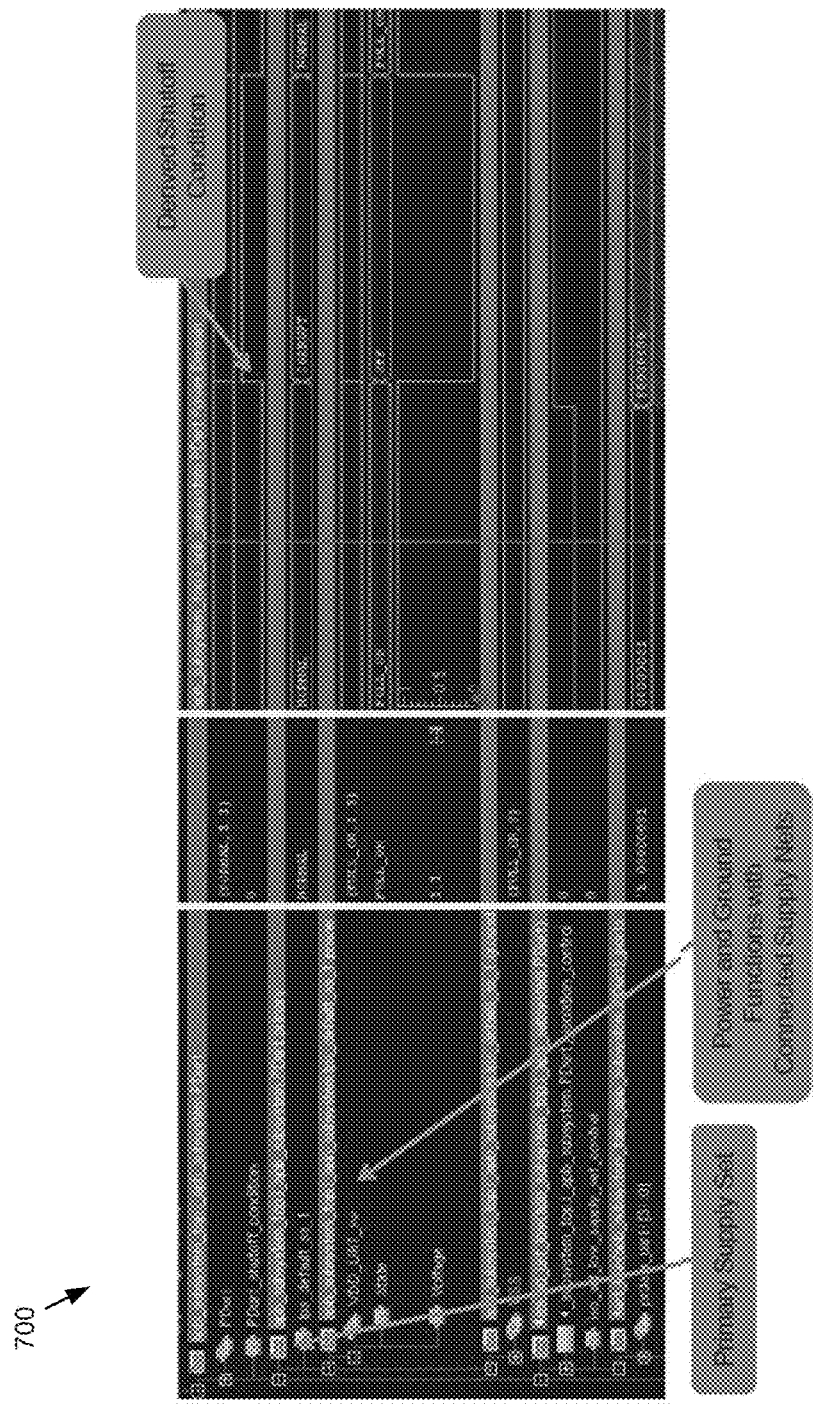
FIG. 7 is a schematic depicting aspects of the display process in accordance with an embodiment of the present disclosure.

Referring now to FIG. 7, an embodiment depicting a power supply network viewer 700 depicted in accordance with display process 10 is provided. Display process 10 may be configured to generate at least one derived power supply network signal. Viewer 700 shows various waveforms of derived signals in a power supply network with supply nets connected to supply sets. Viewer 700 may include "probe -power" functionality that may be used to create derived signals for interesting low power objects. For example, IEEE 1801 power shutoff condition, implicit isolation and retention logic, power domain state (NORMAL, CORRUPT, CORRUPT_ON_ACTIVITY, . . . ), supply nets, and all HDL signals connected to low power specification. In some embodiments, waveform support for derived signals may be integrated into a unified graphical debugging environment using hierarchical waveform groups to organize data into logical groupings to ease the debugging process. A unified debugging environment may refer to a debugging environment that is capable of debugging in multiple HDLs, some of which may include, but are not limited to, e, Open Verification Library (OVL), OVM class library, emerging UVM class library, SystemC®, SystemC Verification Library, SystemVerilog, Verilog®, VHDL, PSL, SVA, CPF, as well as numerous other languages.

Figure 8:
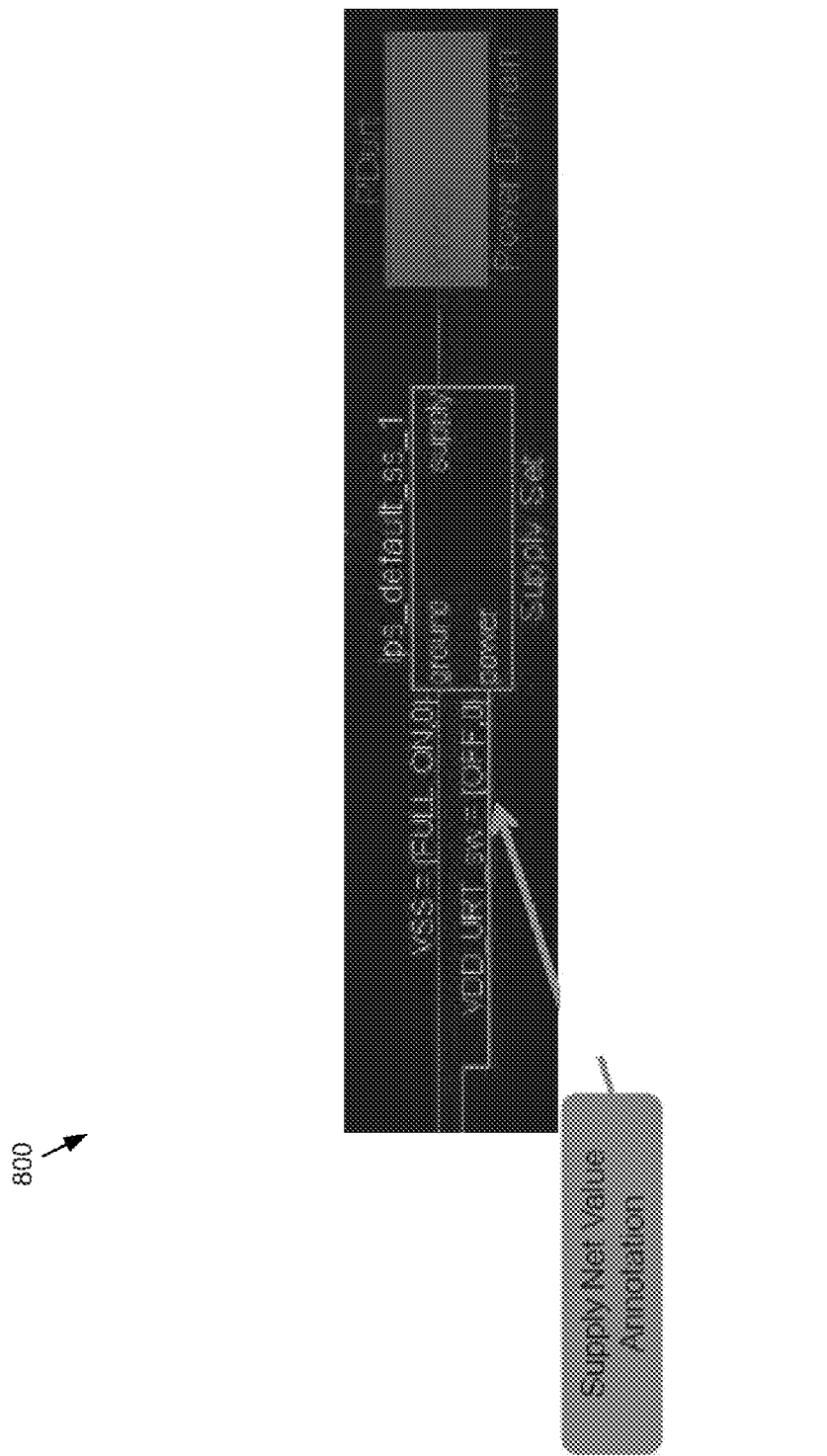
FIG. 8 is a schematic depicting aspects of the display process in accordance with an embodiment of the present disclosure.

Referring now to FIG. 8, an embodiment depicting a power supply network viewer 800 depicted in accordance with display process 10 is provided. Viewer 800 shows waveforms of derived signals in a power supply network with supply nets connected to supply sets.

Figure 9:
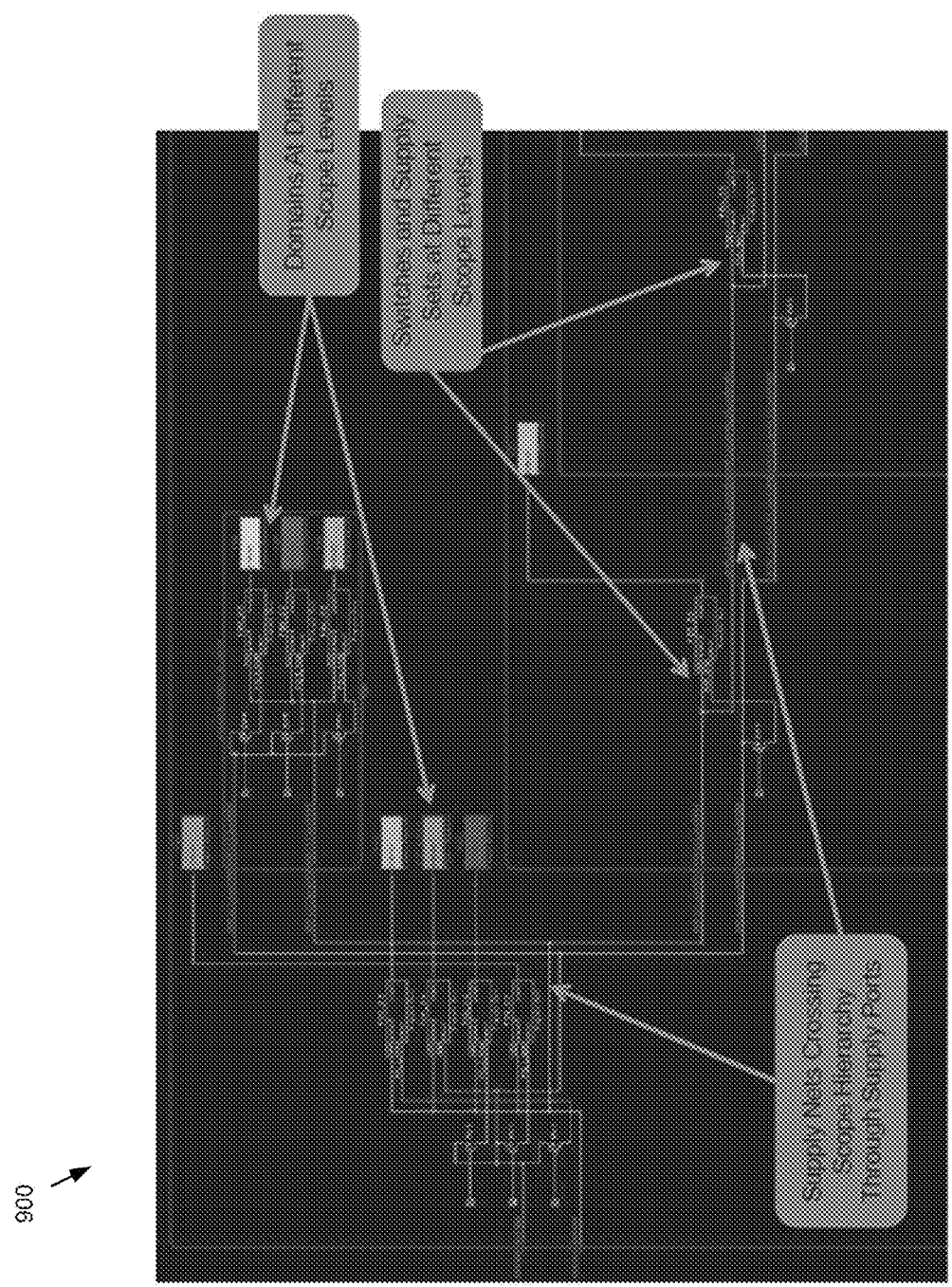
FIG. 9 is a schematic depicting aspects of the display process in accordance with an embodiment of the present disclosure.

Referring now to FIG. 9, an embodiment depicting a power supply network viewer 900 depicted in accordance with display process 10 is provided. Viewer 900 shows a hierarchical power supply network with domains in different scope hierarchies.

Figure 10:
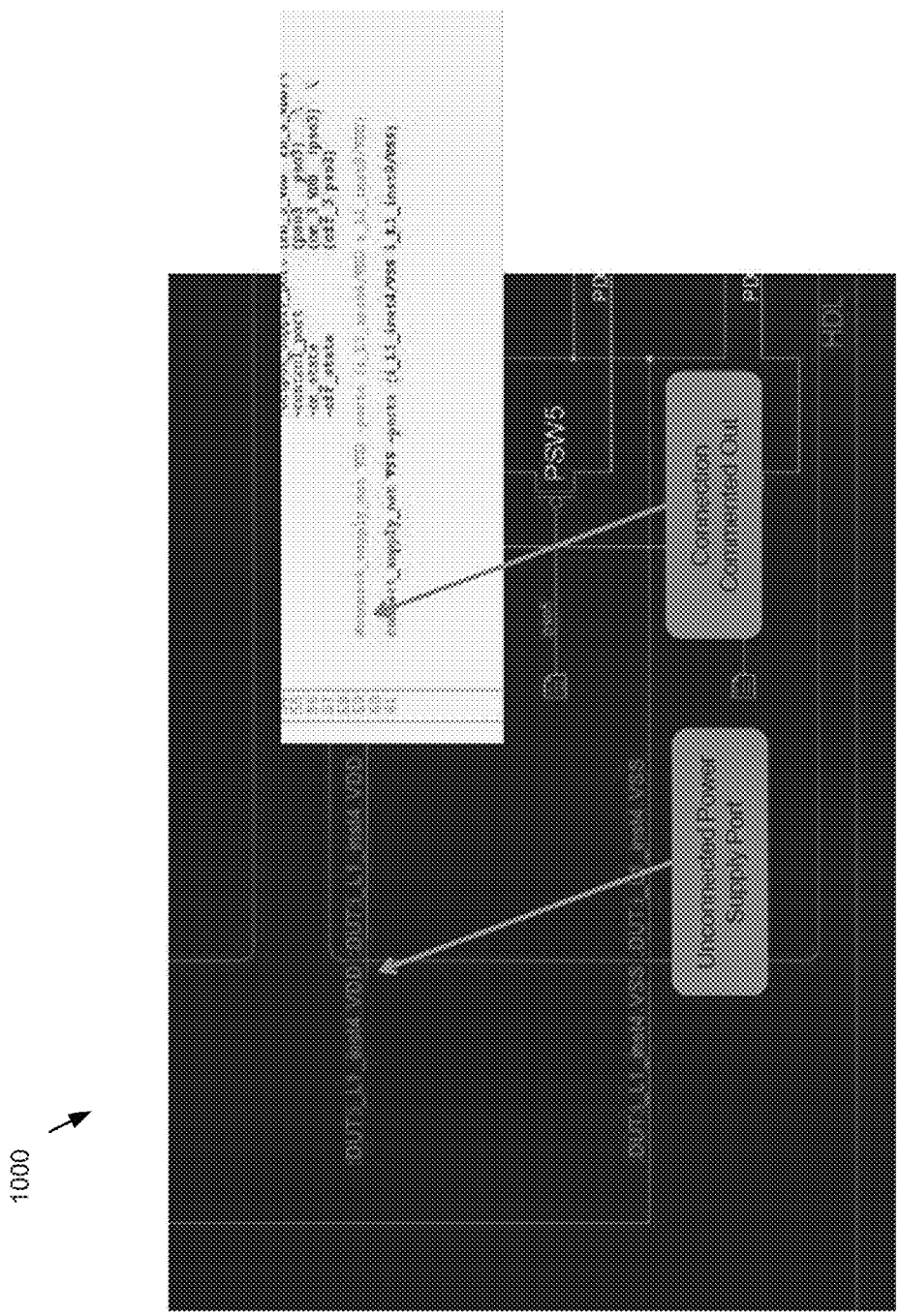
FIG. 10 is a schematic depicting aspects of the display process in accordance with an embodiment of the present disclosure.

Referring now to FIG. 10, an embodiment depicting a power supply network viewer 1000 depicted in accordance with display process 10 is provided. Viewer 1000 shows a visualization, which may be used during debugging. For example, in the location of unconnected nets.

Figure 11:
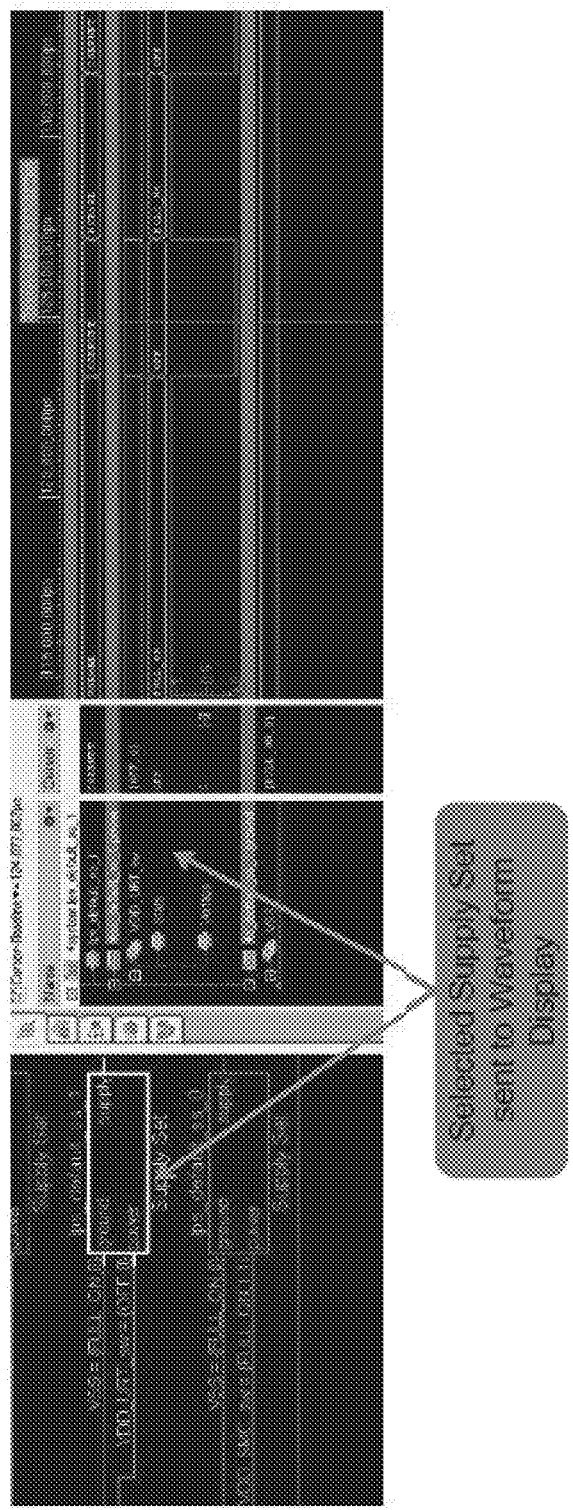
FIG. 11 is a schematic depicting aspects of the display process in accordance with an embodiment of the present disclosure.

Referring now to FIG. 11, an embodiment depicting a power supply network viewer 1100 depicted in accordance with display process 10 is provided. Display process 10 may be configured to integrate the schematic with one or more additional display windows for simultaneous display. Viewer 1100 shows an integrated power supply network viewer and waveform viewer. Accordingly, power supply sets, supply nets, power domains and power switch control ports may be selected and viewed. In some embodiments, viewer 1100 may be annotated with historical values from the waveform database.

Figure 12:
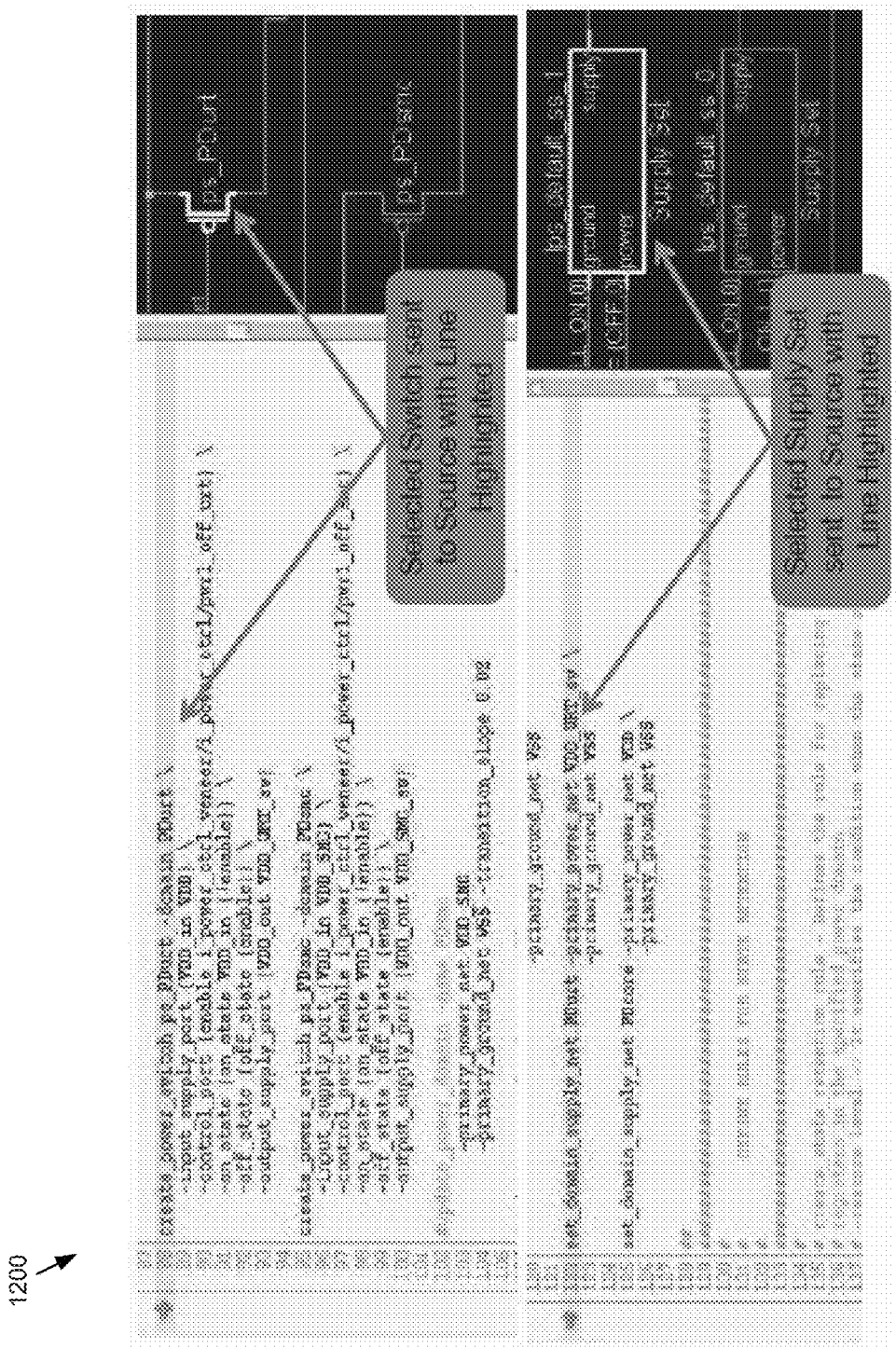
FIG. 12 is a schematic depicting aspects of the display process in accordance with an embodiment of the present disclosure.

Referring now to FIG. 12, an embodiment depicting a power supply network viewer 1200 depicted in accordance with display process 10 is provided. Viewer 1200 shows an integrated power supply network and source viewer.

Figure 13:
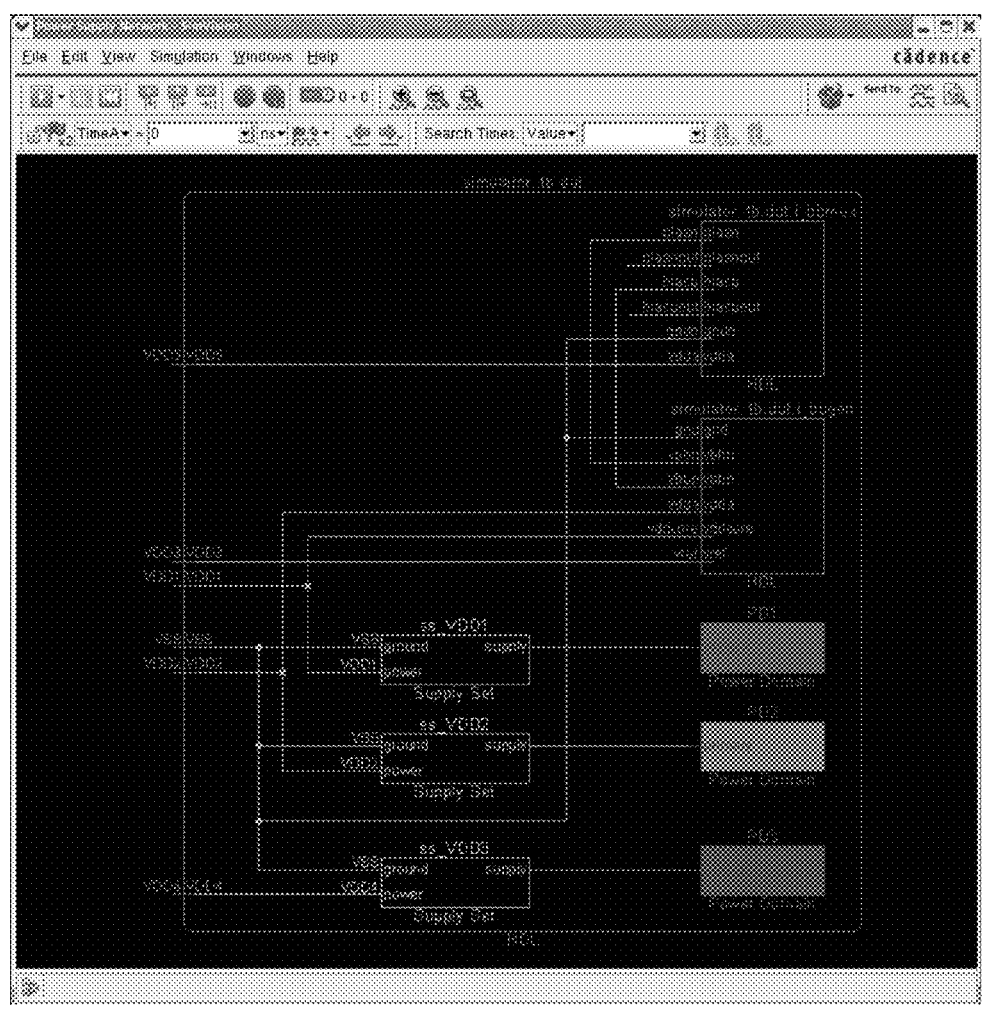
FIG. 13 is a schematic depicting aspects of the display process in accordance with an embodiment of the present disclosure.

Referring now to FIG. 13, an embodiment depicting a power supply network viewer 1300 depicted in accordance with display process 10 is provided. In this particular example, a number of power domains are shown, namely PD1, PD2, and PD3. Viewer 1300 may also include one or more power aware models (e.g. the HDL blocks shown in FIG. 13) in the Power Supply Network. In some embodiments, the connections to the power aware models may be specified in the 1801 UPF file.

In some embodiments, power aware models may be used in various types of designs (e.g. SOC designs). They may include actual power/ground pins as ports of the module. In operation, a user may connect these ports to external power/ground signals using various techniques (e.g. using a "connect_supply_net" command). These models and their power/ground connections may also be visualized in the power supply network so that the designer may verify that they are connected correctly.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for visualizing an electronic circuit design comprising:
   receiving, at one or more computing devices, the electronic circuit design, wherein the electronic circuit design includes at least one Unified Power Format file;
   generating, using the one or more computing devices, a schematic of a power supply network, based upon, at least in part, the at least one Unified Power Format file, the schematic including one or more power supply network components, the one or more power supply network components including one or more power supply sets in accordance with Institute of Electrical and Electronics Engineers "IEEE" 1801 standard;
   displaying a value of at least one of a supply net and a control signal on the schematic of the power supply network, wherein the value is capable of updating dynamically during a simulation and wherein the value may be displayed at any time point during the simulation based upon user input;
   generating at least one derived power supply network signal; and
   displaying the at least one derived power supply network signal in a waveform viewer.

2. The computer-implemented method of claim 1, wherein the schematic is a hierarchical schematic.

3. The computer-implemented method of claim 1, wherein the one or more power supply network components includes at least one power domain.

4. The computer-implemented method of claim 1, wherein the one or more power supply network components includes at least one of power switches and power supply ports.

5. The computer-implemented method of claim 1, wherein the one or more power supply network components includes power supply nets.

6. The computer-implemented method of claim 1, wherein the schematic is configured to display at least one of power switch control ports, power aware models, and hardware description language control signals.

7. The computer-implemented method of claim 1, wherein the schematic is configured for display before, during or after a simulation.

8. The computer-implemented method of claim 1, further comprising:
   integrating the schematic with one or more additional display windows for simultaneous display.

9. A non-transitory computer-readable storage medium for visualizing an electronic circuit design, the computer-readable storage medium having stored thereon instructions that when executed by a machine result in the following operations:
   receiving, at one or more computing devices, the electronic circuit design, wherein the electronic circuit design includes at least one Unified Power Format file;
   generating, using the one or more computing devices, a schematic of a power supply network, based upon, at least in part, the at least one Unified Power Format file, the schematic including one or more power supply network components, the one or more power supply network components including one or more power supply sets in accordance with Institute of Electrical and Electronics Engineers "IEEE" 1801 standard;
   displaying a value of at least one of a supply net and a control signal on the schematic of the power supply network, wherein the value is capable of updating dynamically during a simulation and wherein the value may be displayed at any time point during the simulation based upon user input;
   generating at least one derived power supply network signal; and
   displaying the at least one derived power supply network signal in a waveform viewer.

10. The computer-readable storage medium of claim 9, wherein the schematic is a hierarchical schematic.

11. The computer-readable storage medium of claim 9, wherein the one or more power supply network components includes at least one power domains.

12. The computer-readable storage medium of claim 9, wherein the one or more power supply network components includes at least one of power switches and power supply ports.

13. The computer-readable storage medium of claim 9, wherein the one or more power supply network components includes power supply nets.

14. The computer-readable storage medium of claim 9, wherein the schematic is configured to display at least one of power switch control ports, power aware models, and hardware description language control signals.

15. The computer-readable storage medium of claim 9, wherein the schematic is configured for display before, during or after a simulation.

16. The computer-readable storage medium of claim 9, further comprising:
   integrating the schematic with one or more additional display windows for simultaneous display.

17. A system for visualizing in an electronic circuit design comprising:
   a computing device having at least one processor configured to receive the electronic circuit design, wherein the electronic circuit design includes at least one Unified Power Format file, the at least one processor further configured to generate a schematic of a power supply network, based upon, at least in part, the at least one Unified Power Format file, the schematic including one or more power supply network components, the one or more power supply network components including one or more power supply sets in accordance with Institute of Electrical and Electronics Engineers "IEEE" 1801 standard, the at least one processor further configured to display a value of at least one of a supply net and a control signal on the schematic of the power supply network, wherein the value is capable of updating dynamically during a simulation and wherein the value may be displayed at any time point during the simulation based upon user input, the at least one processor further configured to generate at least one derived power supply network signal and to display the at least one derived power supply network signal in a waveform viewer.

18. The system of claim 17, wherein the schematic is configured for display before, during or after a simulation.

\* \* \* \* \*